(12) United States Patent
Matacotta et al.

(10) Patent No.: US 6,790,423 B2
(45) Date of Patent: Sep. 14, 2004

(54) METHOD FOR THE CATALYTIC OXIDATION OF VOLATILE ORGANIC COMPOUNDS

(75) Inventors: Francesco Cino Matacotta, Trieste (IT); Gianluca Calestani, Parma (IT); Chiara Dionigi, Perugia (IT); Petr Nozar, Bologna (IT)

(73) Assignee: Consiglio Nazionale delle Ricerche, Parma (IT)

(*) Notice: Subject to any disclaimer, the term of this patent is extended or adjusted under 35 U.S.C. 154(b) by 0 days.

(21) Appl. No.: 10/645,693

(22) Filed: Aug. 21, 2003

(65) Prior Publication Data

US 2004/0038813 A1 Feb. 26, 2004

Related U.S. Application Data

(62) Division of application No. 09/590,454, filed on Jun. 9, 2000, now Pat. No. 6,638,492.

(30) Foreign Application Priority Data

Jun. 10, 1999 (IT) .......................................... BO99A0314

(51) Int. Cl.[7] .............................. B01J 8/00; B01J 23/70; B01J 23/72; C01B 31/18; C10K 1/20
(52) U.S. Cl. ........................ 423/247; 502/345; 502/346
(58) Field of Search .................... 423/247; 502/345, 502/346

(56) References Cited

U.S. PATENT DOCUMENTS

| | | | | |
|---|---|---|---|---|
| 5,036,159 A | * | 7/1991 | Aufdembrink et al. | 585/275 |
| 5,227,362 A | * | 7/1993 | Ovshinsky et al. | 505/123 |
| 5,270,024 A | * | 12/1993 | Kasahara et al. | 423/213.2 |
| 5,380,692 A | * | 1/1995 | Nakatsuji et al. | 502/303 |
| 5,882,616 A | * | 3/1999 | Ziebarth et al. | 423/245.3 |
| 6,334,987 B1 | * | 1/2002 | Matacotta et al. | 423/245.3 |

* cited by examiner

*Primary Examiner*—Cam N. Nguyen
(74) *Attorney, Agent, or Firm*—Wood, Phillips, Katz, Clark & Mortimer

(57) ABSTRACT

A catalyst for the full oxidation of volatile organic compounds (VOC), particularly hydrocarbons, and of CO to $CO_2$, comprising:

a non-stoichiometric crystalline compound conventionally designated by a formula which corresponds to $A_{14}Cu_{24}O_{41}$ (I), where A is Sr or a solid solution of Sr with alkaline-earth metals, alkaline metals, lanthanides; or a non-stoichiometric crystalline compound conventionally designated by a formula which corresponds to $B_4Cu_5O_{10}$ (II), where B is Ca or a solid solution of Ca with alkaline-earth metals, alkaline metals, lanthanides; or mixtures thereof; and in that it is prepared in a form which has a large specific surface area, preferably larger than 25 $m^2/g$;

a method for preparing the catalysts; their use in methods for the full oxidation of VOC and of CO to $CO_2$; and the oxidation methods.

1 Claim, 6 Drawing Sheets

Tests conducted with 0.5 g of catalyst by feeding with 700 ml/min air and 15 ml/min methane

METHOD FOR THE CATALYTIC OXIDATION OF VOLATILE ORGANIC COMPOUNDS

CROSS-REFERENCE TO RELATED APPLICATION

This application is a division of Application Ser. No. 09/590,454 filed on Jun. 9, 2000, now U.S. Pat. No. 6,638,492, issued Oct. 28, 2003.

FIELD OF THE INVENTION

The present invention relates to catalysts for the full oxidation of volatile organic compounds (VOC), particularly hydrocarbons, and to a method for the full oxidation of volatile organic compounds (VOC) by using said catalysts.

BACKGROUND OF THE INVENTION

The total combustion of VOC to $CO_2$ and $H_2O$ becomes necessary in view of the toxicity and environmental impact of most unburnt VOC. The goal is to minimize the release of VOC into the atmosphere and the forming of CO, which is in turn a toxic component.

The catalysts used most for VOC combustion are:
a) catalysts based on noble metals, which are characterized by a high cost but also by excellent performance in terms of VOC conversion, and operate at temperatures from 200 to 450° C. according to the reactivity of the compound;
b) catalysts based on mixed oxides, typically chromites of copper or of other metals, or barium hexaaluminate, which are characterized by a lower cost but are active in more drastic conditions (temperatures from 400 to 600° C.). This second class of catalysts is also used for catalytic combustors for power generation units. In this case, they operate at temperatures above 900° C.

The types of catalyst used for the combustion of VOC are not free from drawbacks; high cost (for those based on noble metals) and poor activity (for the second class, accordingly requiring operation at higher temperatures, in conditions in which morphologic or structural transformations are facilitated).

SUMMARY OF THE INVENTION

The aim of the present invention is to eliminate the drawbacks of known types of catalyst for the full oxidation of VOC.

In particular, an object of the present invention is to provide catalysts for catalytic combustion which are characterized by high activity, high resistance to temperature, extreme operating conditions, low cost and easy production even as composites and thin films.

Another object of the present invention is to provide catalysts for VOC oxidation with high selectivity for carbon dioxide $CO_2$ with respect to carbon monoxide CO.

Another object of the present invention is to provide catalysts which lead to full oxidation of the VOC in stoichiometric and non-stoichiometric mixtures of VOC and oxygen (oxidizing or reducing conditions), so that the mixture of gases produced due to VOC oxidation contains no carbon monoxide but contains only carbon dioxide.

Another object of the present invention is to provide a method for the full oxidation of VOC which avoids carbon monoxide removal operations and the known negative consequences of the presence of carbon monoxide in the environment.

Another object is to provide a method for oxidizing VOC to $CO_2$ which utilizes the full potential of the VOC oxidation reaction, with evident energy-related advantages.

Another object is to provide a method for eliminating carbon monoxide from gas mixtures that contain it together with oxygen.

BRIEF DESCRIPTION OF THE INVENTION

This aim, these objects and others which will become apparent from the detailed description of the invention are achieved by catalysts according to the present invention, which comprise one or more non-stoichiometric crystalline compounds conventionally referenced by formulas which respectively correspond to:

1) $A_{14}Cu_{24}O_{41}$
2) $B_4Cu_5O_{10}$ ($BCuO_2$ is also cited in the literature)

and by a method for oxidizing VOC and CO to $CO_2$ according to the present invention, which uses the same catalysts.

In the first of the above cited formulas, A is Sr or a solid solution of Sr with alkaline-earth metals, alkaline metals, lanthanides; in the second formula, B is Ca or a solid solution of Ca with alkaline-earth metals, alkaline metals, or lanthanides.

DETAILED DESCRIPTION OF THE INVENTION

Examples of catalysts according to the invention have the approximate formula or Both of these compounds and their derivatives by substitution are widely known in the literature (for $Ca_4Cu_5O_{10}$ (mentioned as $CaCuO_2$): Roth et al, J Am Ceram Soc, Vol. 72, p. 1545 (1989); for $Sr_{14}Cu_{24}O_{41}$: McCarron et al, Mat Res Bull, Vol. 23, p. 1355 (1988)), and particularly for the compound $Sr_{14}Cu_{24}O_{41}$ there is a vast body of literature associated with its unusual electronic properties. Although it is not possible to formulate exactly the above components, they are unequivocally distinguished by their chemical-physical properties and particularly by the powder diffraction profiles, which correspond to the ones listed in JCPDS international powder diffraction tables, on cards 43-0025 and 46-0054 for the compounds referred to as $Sr_{14}Cu_{24}O_{41}$ and $CaCuO_2$, respectively.

The fixing properties of said compounds and derivatives thereof have been described in patent application BO98A000593 herein incorporated by reference. The same patent application describes the use of said compounds to fix gases and gas fixing devices which comprise said compounds.

The inventors have now found that surprisingly said compounds, if prepared so as to have a large specific surface area, preferably larger than 25 $m^2/g$ (as measured by the BET method), act as catalysts for VOC oxidation. The inventors have found that the reaction for full oxidation of VOC in the presence of the catalysts according to the invention occurs with a high conversion of VOC even at low temperatures.

Moreover, the inventors have found that the catalysts according to the present invention allow VOC oxidation (even when the conversion is partial) with total selectivity toward the forming of $CO_2$ even in conditions in which there is a significant deficit of oxygen with respect to the stoichiometric mix. The expression "total selectivity" is used to reference the fact that VOC oxidation occurs until only $CO_2$ and $H_2O$ are obtained. In other words, in conditions of oxygen deficit, while the quantity that corresponds stoichiometrically to the quantity of oxygen that is present is converted into $CO_2$ and $H_2O$, the other fraction of VOC remains unconverted.

The temperature ranges over which the catalytic oxidation process is active depend crucially on the volatile organic compound to be oxidized. Considering methane as the most stable and least easily oxidizable hydrocarbon, the activation temperatures of the reaction for full oxidation of methane constitute the upper limit of the activation temperatures for any VOC: in particular, the activation temperatures of methane are from 300° C. to 350° C. and from 350° C. to 400° C. for the compounds $A_{14}Cu_{24}O_{41}$ and $B_4Cu_5O_{10}$, respectively. The maximum utilization temperatures of the catalysts instead correspond to the decomposition temperatures of the compounds $A_{14}Cu_{24}P_{41}$ and $B_4Cu_5O_{10}$, which are proximate to 1000° C. and 750° C., respectively.

The methods for full oxidation of VOC according to the present invention may be performed in combustion chambers or in reheat chambers or flue gas chambers.

The catalytic oxidation reaction of the catalysts according to the present invention occurs on a fixed bed or on a fluid bed.

The catalysts according to the present invention can be in the form of granules.

Advantageously, the catalysts according to the present invention include a substrate material. The substrate can be an inert substrate in the form of a thin film or a composite material. Preferably, the substrate material is constituted by porous substrates which are inert with respect to the above described active materials, such as $Al_2O_3$, $TiO_2$, $ZrO_2$, $CeO_2$, $MgO$, on which the active material is deposited by impregnation with the aqueous solution of soluble salts (for example nitrates or citrates or acetates or mixtures thereof) of the constituent metals in the correct stoichiometric ratios.

The catalysts according to the invention preferably comprise 5 to 20% by weight of a non-stoichiometric crystalline compound, conventionally designated by a formula which corresponds to $A_{14}Cu_{24}O_{41}$ (I), where A is Sr or a solid solution of Sr with alkaline-earth metals, alkaline metals, lanthanides; or a non-stoichiometric crystalline compound conventionally designated by a formula which corresponds to $A_4Cu_5O_{10}$ (II), where A is Ca or a solid solution of Ca with alkaline-earth metals, alkaline metals, lanthanides; or mixtures thereof.

A catalyst comprising a non-stoichiometric crystalline compound conventionally designated by a formula which corresponds to $Sr_{14}Cu_{24}O_{41}$ can be prepared, for example, with a method according to the invention which comprises the steps of:

a) immersing a pre-dried granular porous substrate material in an aqueous solution with a molar concentration of $Sr(NO_3)_2$ from 0.23 M to 0.93 M and a molar concentration of $Cu(NO_3)_2$ from 0.39 M to 1.59 M;

b) drying at a temperature from 80° C. to 120° C.;

c) holding at a temperature from 650° C. to 750° C. in a gas stream which contains oxygen until complete decomposition of the nitrates occurs.

A catalyst comprising a non-stoichiometric crystalline compound conventionally designated by a formula which corresponds to $Ca_4Cu_5O_{10}$ is prepared with a method according to the invention which comprises the steps of:

a) immersing a pre-dried granular porous substrate material in an aqueous solution of $Ca(NO_3)_2$ and $Cu(NO_3)_2$ in an equimolar ratio and at a molar concentration from 0.39 M to 1.39 M;

b) drying at a temperature from 80° C. to 120° C.;

c) holding at a temperature from 650° C. to 750° C. in a gas stream which contains oxygen until complete decomposition of the nitrates occurs.

Furthermore, a catalyst comprising a non-stoichiometric crystalline compound conventionally designated by a formula which corresponds to $Ca_4Cu_5O_{10}$ is prepared with a method according to the invention which comprises the steps of:

a) immersing a pre-dried granular porous substrate material in an aqueous solution obtained by dissolving, with the application of heat, CuO and $CaCO_3$ in nitric acid, so that the molar ratio between the components of the solution is $CuO:CaCO_3:HNO_3=1:0.83:3.2$; water and citric acid is added thereto so that the citric acid:Cu molar ratio is from 3.5:1 to 4.0:1;

b) heating in air until combustion of the organic fraction of the absorbed material is achieved;

c) thermal treatment for 4 to 24 hours at a temperature from 650 to 750° C. in a stream of gas containing oxygen.

Preferably, the porous material that is used is constituted by $Al_2O_3$, $ZrO_2$, $CeO_2$, $TiO_2$, MgO.

However, one should not consider the present invention to be limited to catalysts prepared with the described methods.

EXAMPLES

The catalysts according to the present invention and the oxidation method according to the present invention are described in greater detail hereinafter with examples which are given only by way of non-limitative illustration.

Examples of Preparation

1) After drying at 150° C. for 12 hours, an appropriate amount of porous alumina with a particle size from 2 to 4 mm, specific surface area of approximately 400 $m^2/cm^3$ and capable of absorbing at least 1 ml of solution per gram is immersed in an aqueous solution of $Sr(NO_3)_2$ and of $Cu(NO_3)_2$, at a concentration of 0.556 M and 0.952 M, respectively. The amount of alumina used should be such as to absorb almost all the solution. The alumina impregnated by the solution is then dripped, dried at 80° C. for 4 hours, and finally treated at 650° C. in a stream of air or oxygen for 24 h. This method produces a catalyst which contains 12% by weight of $Sr_{14}Cu_{24}O_{41}$ compound and has a specific surface area in excess of 200 $m^2/cm^3$.

2) After drying at 150° C. for 12 hours, an appropriate amount of porous alumina with a particle size from 2 to 4 mm, specific surface area of approximately 400 $m^2/cm^3$ and capable of absorbing at least 1 ml of solution per gram is immersed in an aqueous solution of $Ca(NO_3)_2$ and of $Cu(NO_3)_2$, in an equimolar ratio and at a concentration of 0.556 M. The amount of alumina used should be such as to absorb almost all the solution. The alumina impregnated by the solution is then dripped, dried at 80° C. for 4 hours, and finally treated at 650° C. in a stream of air or oxygen for 24 h. This method produces a catalyst which contains 7% by weight of $Ca_4Cu_5O_{10}$ compound and has a specific surface area in excess of 200 $m^2/cm^3$.

3) After drying at 150° C. for 12 hours, an appropriate amount of porous alumina with a particle size from 40 to 80 mesh, specific surface area of approximately 400 m²/cm³ and capable of absorbing at least 1 ml of solution per gram is immersed in an aqueous solution obtained by dissolving, with the application of heat (80° C.), one mole of CuO and 0.83 moles of $CaCO_3$ in nitric acid so that the nitric acid/copper oxide molar ratio is 3.2, water and citric acid being added thereto, in order to complete dissolution of the reagents, so that the citric acid/Cu molar ratio is 3.8. The amount of alumina used should be such as to absorb almost all the solution. The alumina impregnated by the solution is then dripped and heated in air until combustion of the organic fraction of the absorbed material is achieved. The resulting material is then subjected to thermal treatment at 700° C. in a stream of air or oxygen for 24 h. This method produces a catalyst which contains 11% by weight of $Ca_4Cu_5O_{10}$ compound and has a specific surface area in excess of 200 m²/cm³.

Example 1

$Sr_{14}Cu_{24}O_{41}$: Catalytic Combustion of Methane

A catalyst containing $Sr_{14}Cu_{24}O_{41}$ was used in catalytic methane combustion tests.

The catalyst was a composite material constituted by an inert porous substrate ($Al_2O_3$) containing 12% by weight of active compound (60 mg).

The tests were conducted in a quartz fixed-bed microreactor with a diameter of 4 mm, containing 500 mg of catalysts in granules with particle sizes from 20 to 30 mesh.

Methane and air were fed to the reactor so that the concentration of methane in the test was equal to 2% by volume. The tests were conducted at atmospheric pressure and at a spatial velocity, expressed as GHSV (gas hourly space velocity: hourly volumetric flow-rate in feed/volume or weight of catalyst), equal to 80,000 cm³/gh and 55,000 cm³/gh, respectively. The mixture of the reaction products was analyzed by gas chromatography. The only products formed during the tests were carbon dioxide and water.

Figure 1:
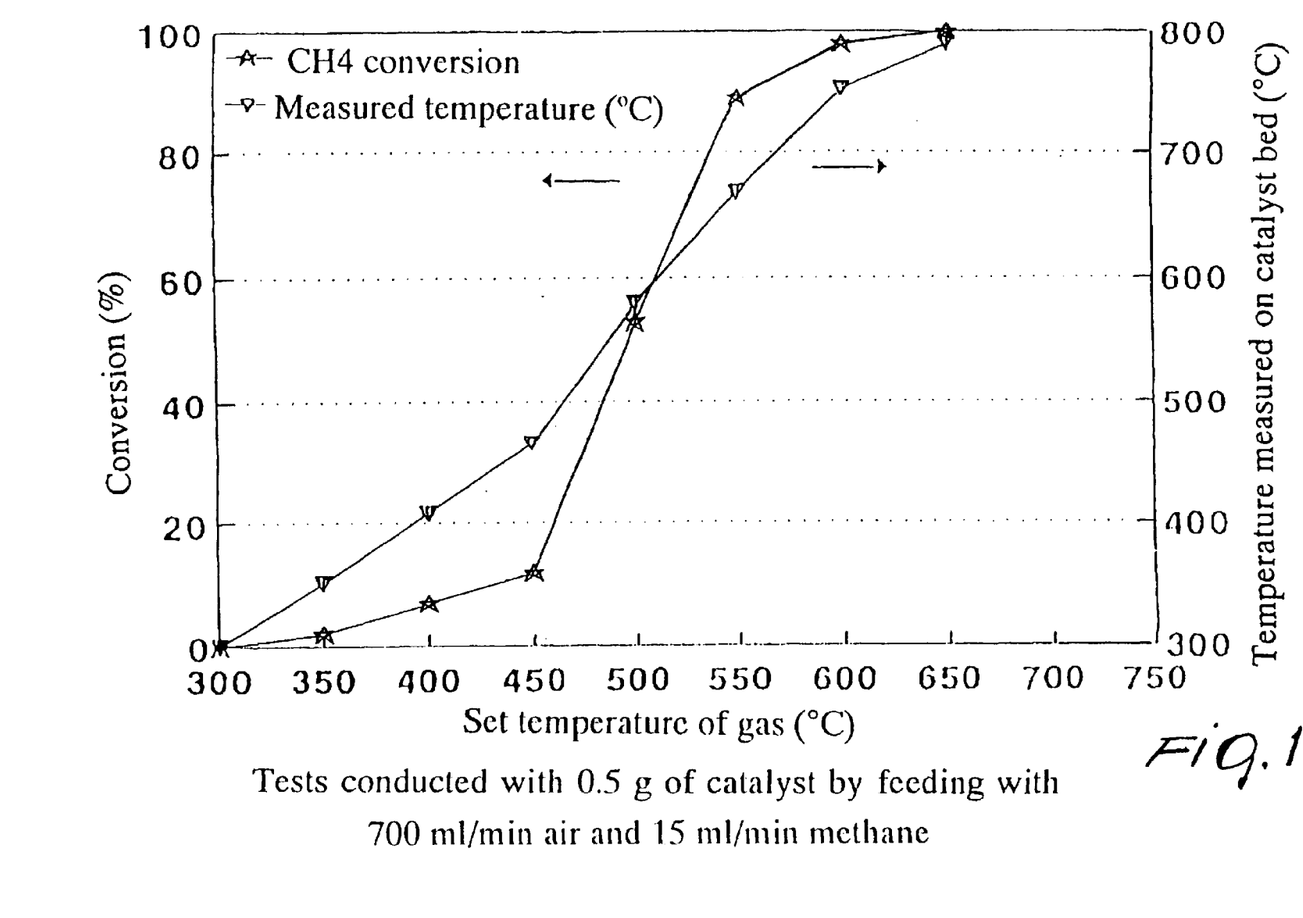

The results of the tests at various spatial velocities were found to be identical within the experimental error: the result obtained at 80,000 cm³/gh is plotted in FIG. 1, where the term "conversion" references the percentage in moles of converted methane with respect to the moles of supplied methane. The expression "set temperature" designates the temperature of the mixture of gas fed to the reactor, and the term "measured temperature" designates the temperature of the gas mixture at the outlet of the reactor, which is considered equal to the temperature of the catalyst.

Methane conversion begins at a temperature from 300 to 350° C. The resulting conversion curve has an inflection point at the temperature of 500° C. Total conversion is achieved at 650° C. Throughout the conversion process, the only products obtained were $CO_2$ and $H_2O$.

From the point of view of molecule reactivity, methane is to be considered difficult to oxidize. The required reaction conditions are therefore extremely drastic if compared with the other paraffins, olefins or volatile organic compounds. The tests that have been conducted have shown that the compound according to the invention is capable of oxidizing methane at relatively low temperatures: this is an indicator of the high full oxidation capacity of the invention compounds. As regards the other volatile organic compounds, one should assume that total combustion occurs at markedly lower temperatures than those found for methane.

Example 2

$Ca_4Cu_5O_{10}$: Catalytic Combustion of Methane

A catalyst containing $Ca_4Cu_5O_{10}$ was used in catalytic methane combustion tests. The tests were conducted in a quartz fixed-bed microreactor with a diameter of 4 mm, containing 500 mg of catalysts in granules with particle sizes from 20 to 30 mesh.

The catalyst was a composite material constituted by an inert porous substrate ($Al_2O_3$) containing 7.5% by weight of active compound (38 mg).

Methane and air were fed to the reactor so that the concentration of methane in the test was equal to 2% by volume. The tests were conducted at atmospheric pressure and at a spatial velocity, expressed as GHSV (gas hourly space velocity: hourly volumetric flow-rate in feed/volume or weight of catalyst), equal to 80,000 cm³/gh and 55,000 cm³/gh, respectively. The mixture of the reaction products was analyzed by gas chromatography. The only products formed during the tests were carbon dioxide and water.

Figure 2:
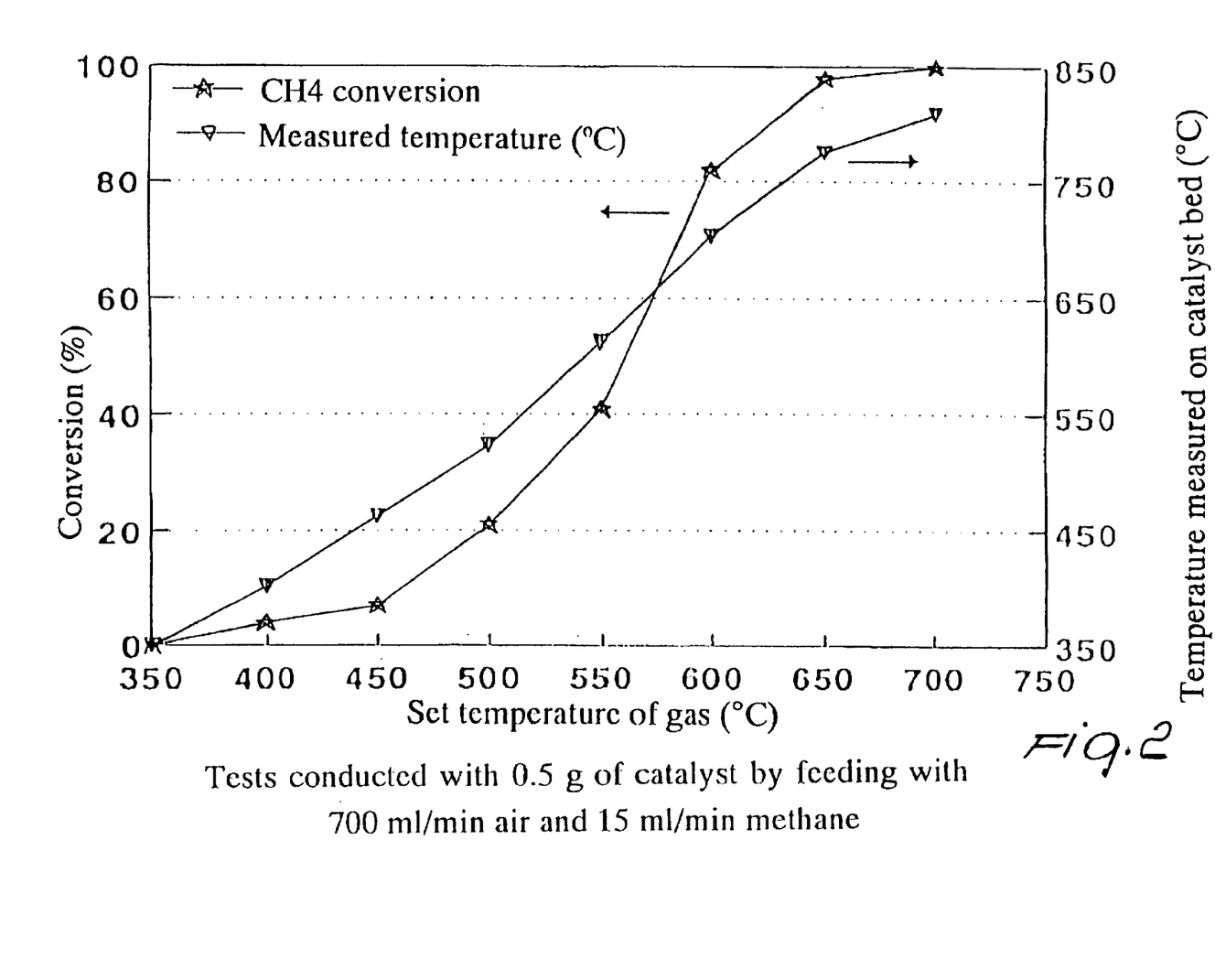

The results of the tests at various spatial velocities were found to be identical within the experimental error: the result obtained at 80,000 cm³/gh is plotted in FIG. 2, where the term "conversion" designates the percentage in moles of converted methane with respect to the moles of supplied methane. The expression "set temperature" designates the temperature of the mixture of gas fed to the reactor, and the term "measured temperature" designates the temperature of the gas mixture at the outlet of the reactor, which is considered equal to the temperature of the catalyst.

Methane conversion begins at a temperature from 350 to 400° C. The resulting conversion curve has an inflection point at the temperature of 550° C. Total conversion is achieved at 700° C. Throughout the conversion process, the only products obtained were $CO_2$ and $H_2O$.

Example 3

$Sr_{14}Cu_{24}O_{41}$: Tests of Methane Combustion in Oxygen Deficit Conditions A catalyst $Sr_{14}Cu_{24}O_{41}$, fully similar to the one used in the test cited in example 1, was used in tests of methane combustion in oxygen deficit conditions. The tests were conducted in a quartz fixed-bed microreactor with a diameter of 4 mm, which contained 200 mg of catalyst in granules whose dimensions were from 20 to 30 mesh. Methane, oxygen and helium in a proportion of 2:1:20 vol/vol were fed to the reactor. The test was conducted at atmospheric pressure and at a spatial velocity, expressed as GHSV, equal to 80,000 cm³/gh. The mixture of the reaction products was analyzed by gas chromatography. The products present in the gases in output at temperatures below 900° C. were carbon dioxide and water, generated in a stoichiometric quantity with respect to the fed oxygen and excess unreacted methane.

Figure 3:
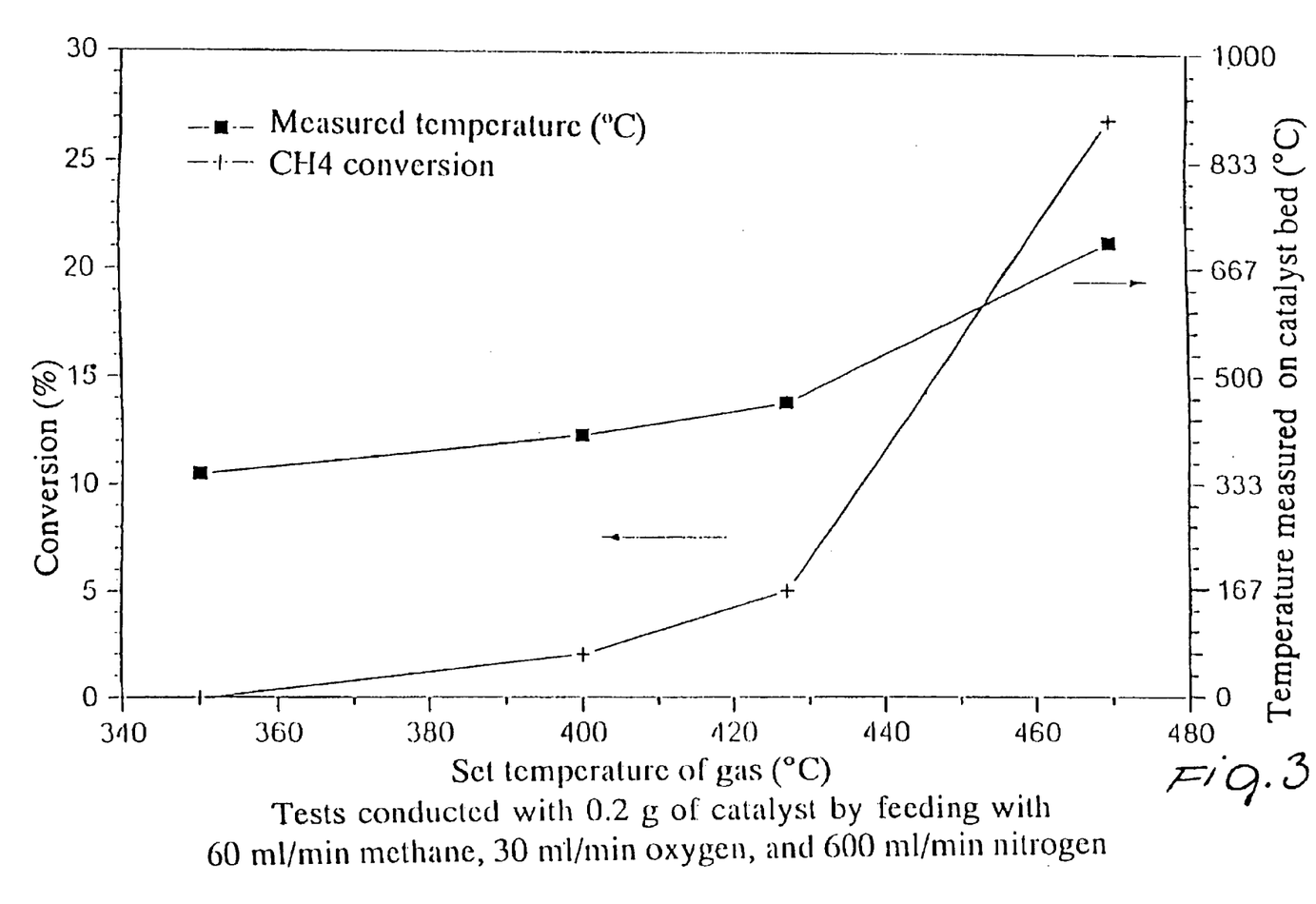

The results of the activity test are plotted in FIG. 3, where the term "conversion" designates the percentage of moles of converted methane with respect to the moles of supplied methane. The amounts of methane and oxygen used in the experiment allow a maximum conversion of 25% of the methane. The maximum value achieved and plotted in FIG. 3 is within the expected experimental error.

Example 4

$Ca_4Cu_5O_{10}$: Tests of Methane Combustion in Oxygen Deficit

A catalyst $Ca_4Cu_5O_{10}$, fully similar to the one used in the test cited in example 2, was used in tests of methane combustion in oxygen deficit conditions. The tests were conducted in a quartz fixed-bed microreactor with a diameter of 4 mm, which contained 500 mg of catalyst in granules whose dimensions were from 20 to 30 mesh. Methane, oxygen and helium in a proportion of 2:1:4 vol/vol/vol were fed to the reactor.

The test was conducted at atmospheric pressure and at a spatial velocity, expressed as GHSV, equal to 80,000 cm$^3$/gh. The mixture of the reaction products was analyzed by gas chromatography. The products present in the gases in output at temperatures below 720° C. were carbon dioxide and water, generated in a stoichiometric quantity with respect to the fed oxygen and excess unreacted methane.

Figure 4:
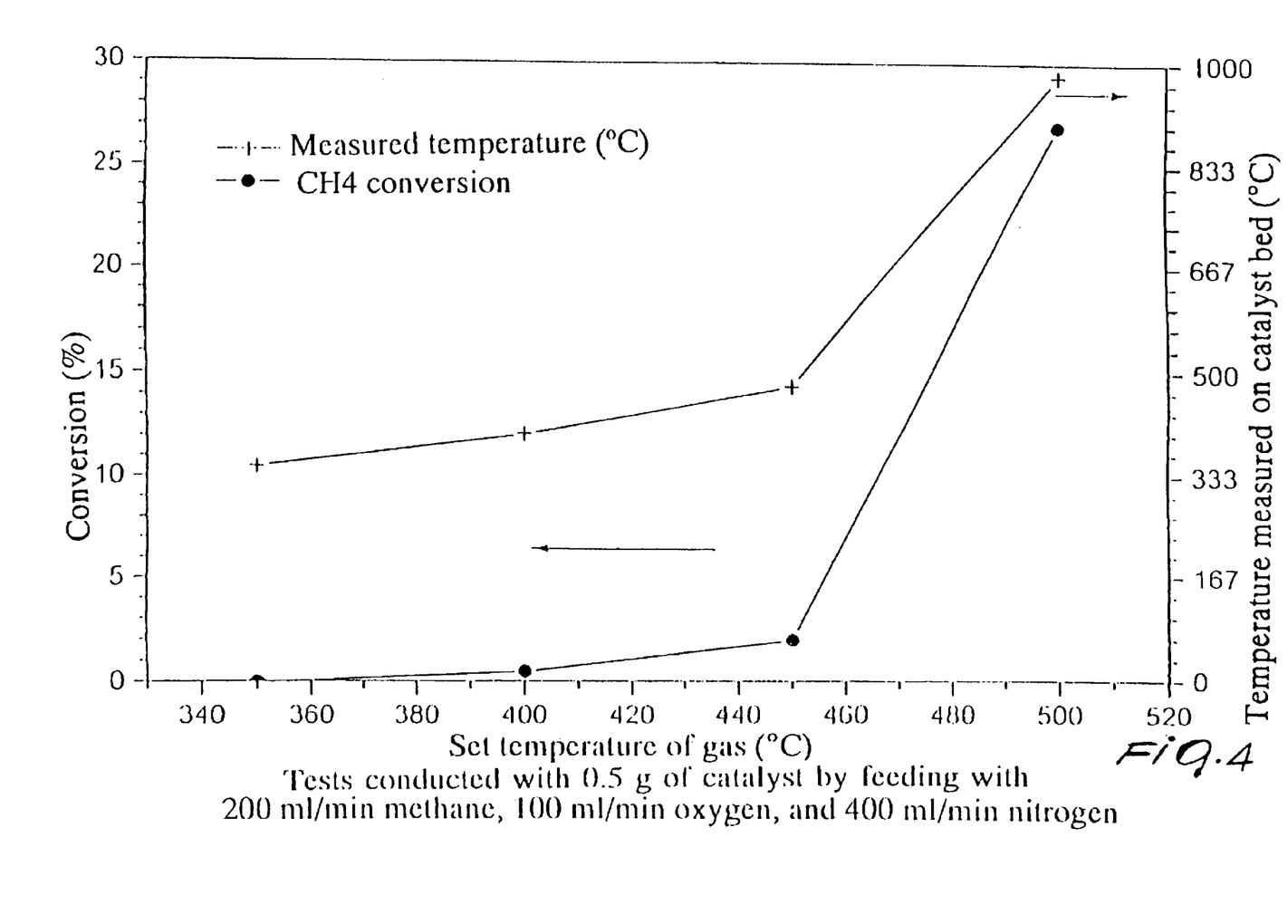

The results of the activity test are plotted in FIG. 4, where the term "conversion" designates the percentage of moles of converted methane with respect to the moles of supplied methane. The amounts of methane and oxygen used in the experiment allow a maximum conversion of 25% of the methane. The maximum value achieved and plotted in FIG. 4 is within the expected experimental error.

Example 5

$Sr_{14}Cu_{24}O_{41}$: Conversion of CO to $CO_2$

The catalyst $Sr_{14}Cu_{24}O_{41}$ prepared as described in example 1 was used in tests of conversion of carbon monoxide, CO, to carbon dioxide, $CO_2$. The tests were conducted in a quartz fixed-bed microreactor with a diameter of 4 mm, containing 0.5 g of catalyst in granules having dimensions from 20 to 30 mesh. Carbon monoxide, oxygen and nitrogen in a volumetric concentration of 1%, 5% and 94%, respectively, were fed to the reactor.

The test was conducted at atmospheric pressure and at a spatial velocity of 50,000 cm$^3$/hg. The mixture of reaction products was analyzed by gas chromatography, using helium as the carrier gas. The composition of the resulting mixture of gases was analyzed by measuring the concentrations of CO and $CO_2$, which were found to be consistent with the reaction $2CO+O_2 \rightarrow 2CO_2$.

Figure 5:
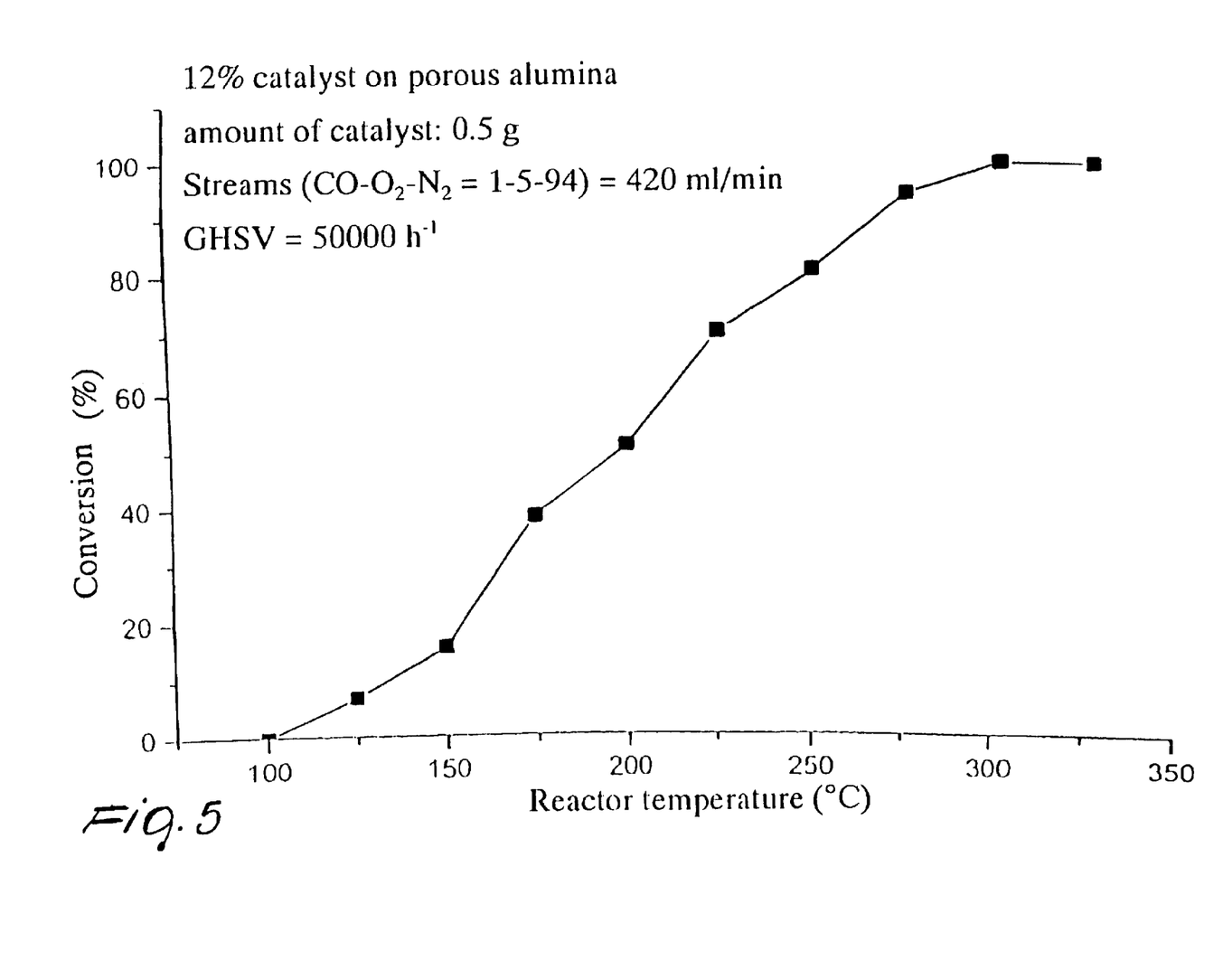

The results of the test are plotted in FIG. 5, where the term "conversion" designates the percentage of moles of converted CO with respect to the moles of supplied CO.

Example 6

$Ca_4Cu_5O_{10}$: Conversion of CO to $CO_2$

A catalyst containing $Ca_4Cu_5O_{10}$ was used in tests of conversion of carbon monoxide, CO, to carbon dioxide, $CO_2$. The tests were conducted in a quartz fixed-bed microreactor with a diameter of 4 mm, containing 0.5 g of catalyst in granules having dimensions from 20 to 30 mesh. Carbon monoxide, oxygen and nitrogen in a volumetric concentration of 1%, 5% and 94%, respectively, were fed to the reactor.

The catalyst was a composite material constituted by an inert porous substrate ($Al_2O_3$) containing 11% by weight of active compound (55 mg).

The test was conducted at atmospheric pressure and at a spatial velocity of 50,000 cm$^3$/hg. The mixture of reaction products was analyzed by gas chromatography, using helium as the carrier gas. The composition of the resulting mixture of gases was analyzed by measuring the concentrations of CO and $CO_2$, which were found to be consistent with the reaction $2CO+O_2 \rightarrow 2CO_2$.

Figure 6:
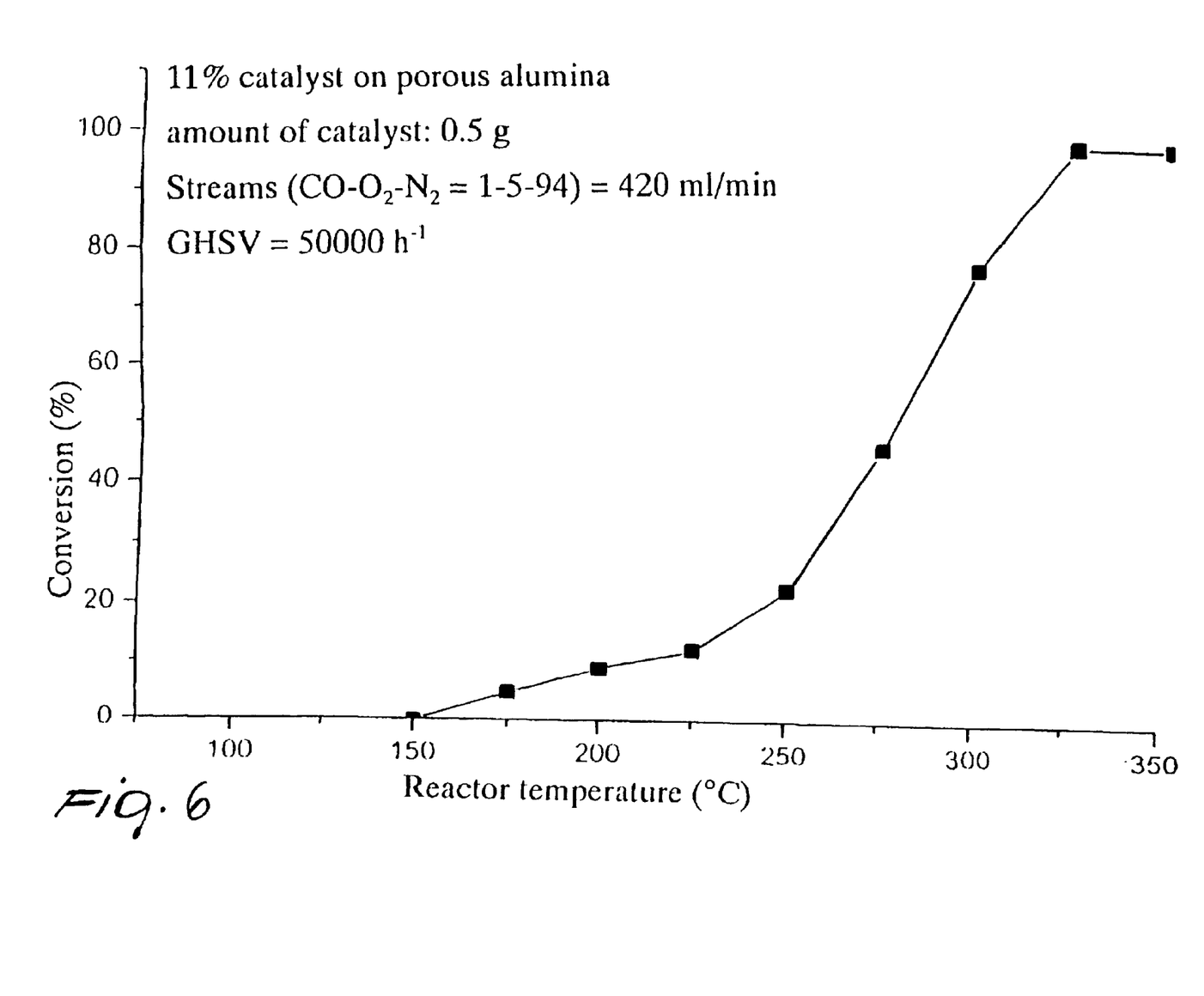

The results of the test are plotted in FIG. 6, where the term "conversion" designates the percentage of moles of converted CO with respect to the moles of supplied CO.

The catalysts according to the present invention and the method for full oxidation of VOC according to the present invention can be used with good results for organic compounds which are gaseous or vaporize at low temperature, achieving complete combustion at low temperature. The $CO_2$ selectivity of the catalysts according to the present invention is an important characteristic. Oxidation of VOC, particularly hydrocarbons, with catalysts which are not specific for combustion usually leads to the generation of both CO and $CO_2$. Both products are thermodynamically favored in the conditions that are normally used, and the ratio is therefore usually conditioned by kinetic factors.

Accordingly, the specificity of the catalyst in the forming of $CO_2$ is linked to the characteristics of the active centers. $CO_2$ is in fact the primary product, as demonstrated by the tests conducted by varying the contact time, which show that the conversion does not depend on the spatial velocity, and therefore does not derive from the intermediate forming of CO. It is also important to note that the primary carbon monoxide, i.e., the carbon monoxide that does not derive from partial oxidation of VOC, is converted efficiently into carbon dioxide at temperatures above 100° C. in the case of $A_{14}Cu_{24}O_{41}$, and 150° C. in the case of $Ca_4Cu_5O_{10}$ in the presence of oxygen at a concentration which is sufficient to allow the reaction.

The catalysts according to the present invention and the method for full oxidation of gaseous organic compounds can be used to reduce or eliminate many noxious components of combustion gases generated in any manner, for example from very large-scale electric power stations down to small combustors for home use, including the important applications in the field of engines and of vehicles with internal-combustion engines.

The selectivity of the $CO_2$ yield furthermore makes it particularly interesting to use the catalysts according to the present invention in burners for closed environments (gas stoves, water heaters for sanitary use, cooking equipment, et cetera), in which the presence of CO and in combustion products is notoriously a severe health hazard.

Furthermore, the catalysts according to the present invention, particularly the compounds of the $Sr_{14}Cu_{24}O_{41}$ type, convert the carbon monoxide that is present in gas mixtures containing oxygen into carbon dioxide in a very efficient way and at low temperature.

The catalysts for catalytic oxidation according to the present invention are characterized by high activity, comparable to that exhibited by the more expensive noble metals and by the material $Ba_2Cu_3O_6$, by high resistance to temperature and to extreme operating conditions, and by low cost and simple production even in the form of compounds and thin films.

Furthermore, like the material $Ba_2Cu_3O_6$, they have a selectivity for carbon dioxide, $CO_2$, with respect to carbon monoxide, CO. The advantages of the materials $A_{14}Cu_{24}O_{41}$ and $B_4Cu_5O_{10}$ with respect to the material $Ba_2Cu_3O_6$ relate to:

reduced limitation in the deposition of large quantities of active material of the supported catalyst containing Ca or Sr with respect to the catalyst containing Ba;

a very advantageous cost with respect to Ba compounds;

lack of toxicity of Ca and Sr with respect to heavy metals such as Ba;

exclusively for the compound $Sr_{14}Cu_{24}O_{41}$, higher catalytic activity in all full oxidation reactions for equal temperature conditions.

The catalysts according to the present invention lead to full oxidation of VOC in stoichiometric mixtures of methane and oxygen or in excess of oxygen (oxidizing conditions). In this manner, the mixture of gases produced by VOC oxidation contains no carbon monoxide but contains only carbon dioxide. In this manner, the operations for removing carbon monoxide, and the known negative consequences of its presence in the environment, are avoided. Moreover, by oxidizing the carbon monoxide to carbon dioxide, the entire potential of the VOC oxidation reaction is utilized, providing evident energy-related advantages.

The disclosures in Italian Patent Application No. BO99A000314 from which this application claims priority are incorporated herein by reference.

What is claimed is:

1. A method for converting carbon monoxide to carbon dioxide, in the presence of a catalyst having a non-stoichiometric crystalline compound designated by a formula which corresponds to $A_{14}Cu_{24}O_{41}$ (I), where A is Sr or a solid solution of Sr with alkaline-earth metals, alkaline metals, lanthanides; a non-stoichiometric crystalline compound designated by a formula which corresponds to $B_4Cu_5O_{10}$, (II), where B is Ca or a solid solution of Ca with alkaline-earth metals, alkaline metals, lanthanides; or mixtures thereof; wherein the catalyst has a large specific surface area, preferably larger than 25 m$^2$.

* * * * *

UNITED STATES PATENT AND TRADEMARK OFFICE
CERTIFICATE OF CORRECTION

PATENT NO. : 6,790,423 B2
DATED : September 14, 2004
INVENTOR(S) : Matacotta et al.

It is certified that error appears in the above-identified patent and that said Letters Patent is hereby corrected as shown below:

Title page,
Item [73], Assignee, should read
-- Consiglio Nazionale Delle Ricerche, Roma, Italy
and
Universita Degli Studi Di Parma, Parma, Italy --.

Signed and Sealed this

Sixteenth Day of August, 2005

JON W. DUDAS
*Director of the United States Patent and Trademark Office*